United States Patent
Santanda

(12) United States Patent
(75) Inventor: Tsutomu Santanda, Kosai (JP)
(73) Assignee: Yazaki Corporation, Tokyo (JP)
(*) Notice: Subject to any disclaimer, the term of this patent is extended or adjusted under 35 U.S.C. 154(b) by 0 days.
(21) Appl. No.: 10/923,880
(22) Filed: Aug. 24, 2004

(65) Prior Publication Data
US 2005/0056442 A1    Mar. 17, 2005

(30) Foreign Application Priority Data
Aug. 25, 2003  (JP)  ............... P.2003-299985

(51) Int. Cl.
H01B 7/00  (2006.01)
(52) U.S. Cl. .............. 174/154; 174/135; 248/74.1; 248/74.2; 248/74.3
(58) Field of Classification Search ............... 174/162, 174/72 A, 68.1, 68.3, 135, 138 G, 154; 248/73, 248/62, 69, 74.2, 67.7, 68.1, 68.3, 74.3, 229.1, 248/229.13, 229.16, 228.7, 231.81; 138/135
See application file for complete search history.

(10) Patent No.:  US 7,053,311 B2
(45) Date of Patent:  May 30, 2006

(56) References Cited

U.S. PATENT DOCUMENTS

| 3,501,117 | A | * | 3/1970 | Soltysik | .......... | 248/71 |
| 3,917,202 | A | * | 11/1975 | Reinwall et al. | .......... | 248/68.1 |
| 4,700,913 | A | * | 10/1987 | Hirano et al. | .......... | 248/73 |
| 5,393,021 | A | * | 2/1995 | Nelson | .......... | 248/71 |
| 5,448,017 | A | * | 9/1995 | Nakajima et al. | .......... | 174/152 G |
| 6,177,635 | B1 | * | 1/2001 | Sugiura et al. | .......... | 174/138 G |
| 6,354,543 | B1 | * | 3/2002 | Paske | .......... | 248/68.1 |

FOREIGN PATENT DOCUMENTS

JP  2000-69642 A  3/2000

* cited by examiner

Primary Examiner—Jinhee Lee
(74) Attorney, Agent, or Firm—Sughrue Mion, PLLC

(57) ABSTRACT

A fixing device for fixing an elongate member along a plate member includes a holding portion which holds the elongate member, an engagement member which retains the plate member and a resilient portion which resiliently contacts with a face of the plate member.

3 Claims, 3 Drawing Sheets

_US 7,053,311 B2_

FIXING DEVICE

BACKGROUND OF THE INVENTION

This invention relates to a fixing device for fixing a grommet for the passage of a wire harness (installed, for example, in a vehicle or the like) therethrough so as to protect it.

Generally, one example of those members which are opened and closed relative to a vehicle body through a link mechanism is a trunk lid. In addition to tall lamps, a license plate lamp and a high-mount stop lamp, a wiper is mounted on the trunk lid in some kinds of cars as in a hatch back-type car. Therefore, it is necessary to install a wire harness (elongate member) between the vehicle body and the trunk lid so as to supply electric power to these parts.

This wire harness is passed through the bore of a grommet, and is protected by this grommet, the grommet including a first fixing portion of an annular shape for being fixed to the vehicle body, a second fixing portion of an annular shape for being fixed to the trunk lid, and a flexible tubular portion extending between the first fixing portion and the second fixing portion.

When the flexible tubular portion of the grommet is freely deformed during the opening and closing of the trunk lid, there is a fear that the wire harness is pinched by the trunk lid when the trunk lid is closed, so that the wire harness within this tubular portion is cut. Therefore, in the related structure, the tubular portion of the grommet is fixed to a plate member of the link mechanism through a clip, thereby preventing the tubular portion from being pinched by the trunk lid (see, for example, JP-A-2000-69642).

In the above related clip structure, however, the clip is fixed to the plate member of the link mechanism in such a manner that the clip generally embraces the plate member, and therefore there is encountered a problem that the clip tends to move or shake in the direction of the length of the plate member when the trunk lid is repeatedly opened and closed.

SUMMARY OF THE INVENTION

It is therefore an object of the present invention to provide a fixing device which is prevented from shaking in a longitudinal direction of a plate member.

In order to achieve the above object, according to the present invention, there is, provided a fixing device for fixing an elongate member along a plate member, comprising;

a holding portion, which holds the elongate member;

an engagement member, which retains the plate member; and a resilient portion, which resiliently contacts with a face of the plate member.

Preferably, the engagement member is a pair of arm portions which retain widthwise opposite side edges of the plate member. The resilient portion is resilient blades which is formed at both ends of the holding portion in a longitudinal direction of the plate member.

Here, for example, a link of a link mechanism or others can be used as the plate member, and for example a wire harness, a hose, a grommet (having a wire harness passed therethrough) or others can be used as the elongate member.

In the fixing device, the holding portion holds the elongate member, and in this condition the pair of arm portions are engaged with the widthwise opposite side edges of the plate member, respectively, and also the blade portions are held in resilient contact with the surface of the plate member. Therefore, the fixing device is prevented from shaking in the longitudinal direction of the plate member.

Therefore, the fixing device solves a problem (as encountered with the related structure) that when the trunk lid or the like is repeatedly opened and closed, the fixing device shakes in the longitudinal direction of the plate member.

Preferably, step portions which are respectively engaged with the arm portions are provided at the widthwise opposite side edges of the plate member, respectively.

In the fixing device, the pair of arm portions are retainingly engaged respectively with the step portions provided respectively at the widthwise opposite side edges of the plate member, and by doing so, the shaking of the clip in the longitudinal direction of the plate member can be more positively prevented.

Preferably, the holding portion has a generally tubular shape to allow gripping the elongate member.

The present invention solves a problem (as encountered with the related structure) that when the trunk lid or the like is repeatedly opened and closed, the fixing device shakes in the longitudinal direction of the plate member. Therefore, the fixing device is prevented from shaking in the longitudinal direction of the plate member.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

Figure 1:
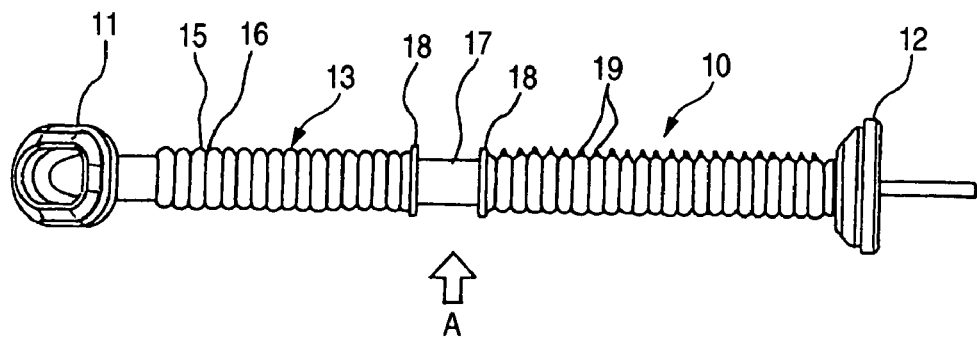
FIG. 1 is a view showing a grommet to be attached to a clip according to a preferred embodiment of the invention.
Figure 4:
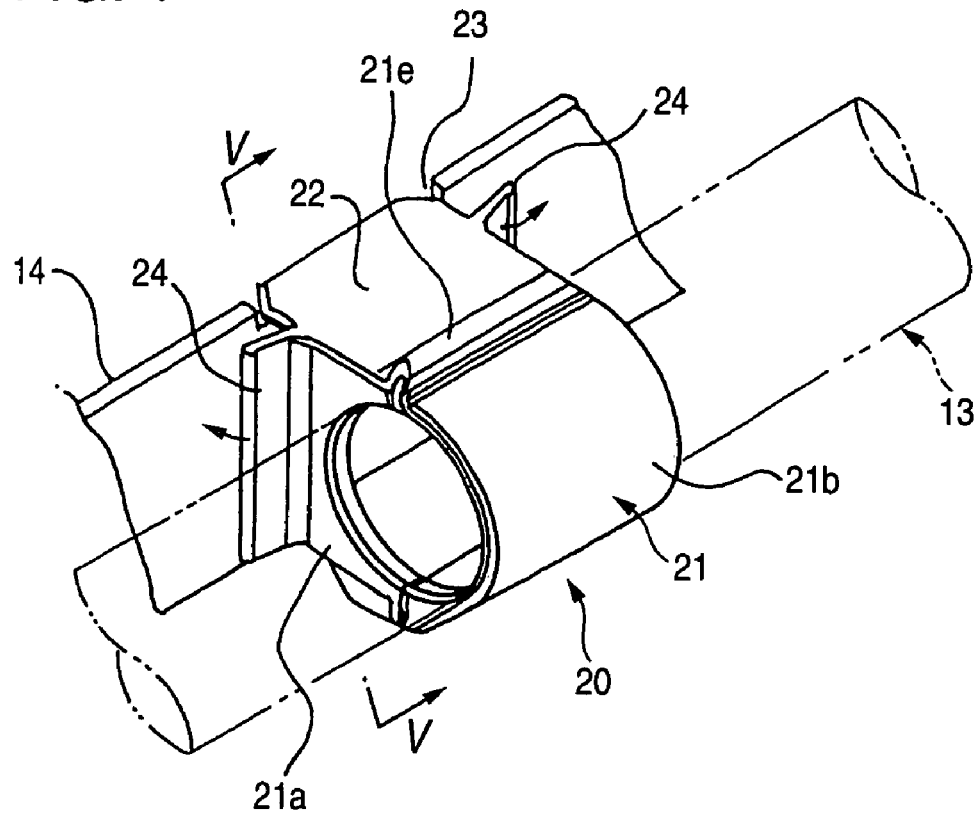
FIG. 4 is a perspective view showing the whole of the clip.
Figure 5:
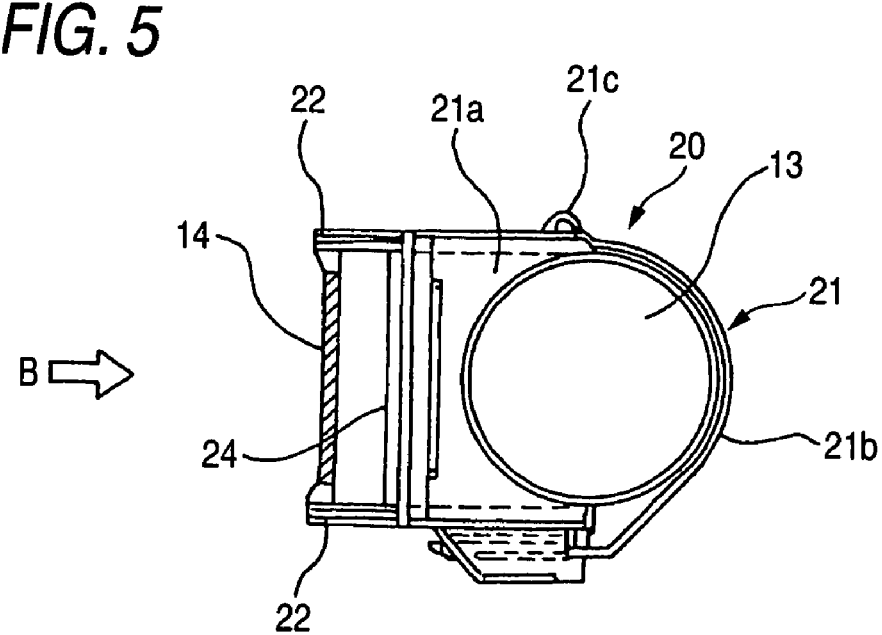
FIG. 5 is a cross-sectional view taken along the line V—V of FIG, 4.
Figure 6:
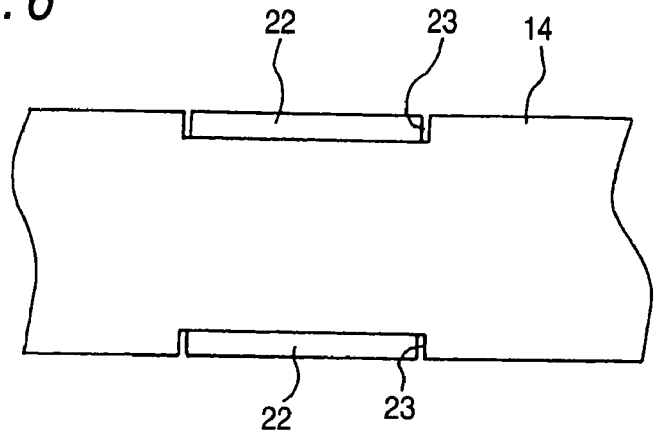
FIG. 6 is a view as seen from a direction of arrow B of FIG. 5.
Figure 7:
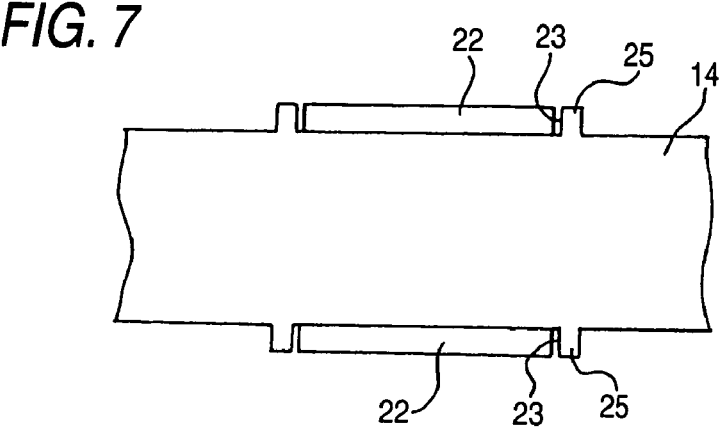
FIG. 7 is a view showing modified step portions.
Figure 8:
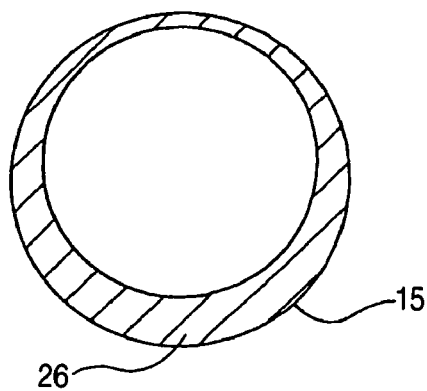
FIG. 8 is a view showing a modified thickened portion of a tubular portion.

A preferred embodiment of the present invention will now be described in detail with reference to the drawings. FIG. 1 is a view showing a grommet to attached to a clip according to a preferred embodiment of the invention, FIG. 2 is a view as seen from a direction of arrow A of FIG. 1, FIG. 3 is a cross-sectional view taken along the line III—III of FIG. 2, FIG. 4 is a perspective view showing the whole of the clip, FIG. 5 is a cross-sectional view taken along the line V—V of FIG. 4, FIG. 6 is a view as seen from a direction of arrow 8 of FIG. 5, FIG. 7 is a view showing modified step portions, and FIG. 8 is a view showing a modified thickened portion of a tubular portion.

Figure 2:
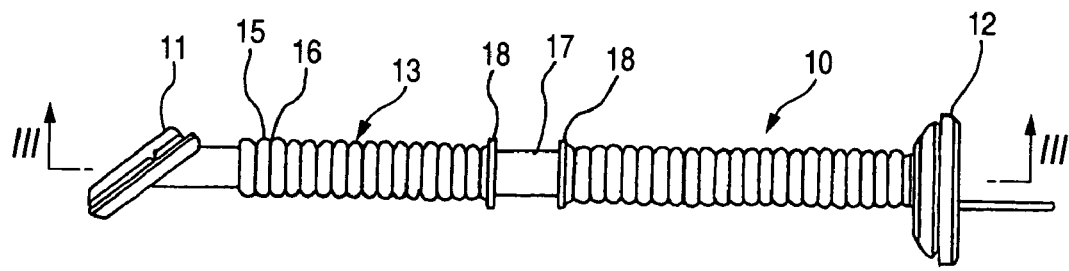
FIG. 2 is a view as seen from a direction of arrow A of FIG. 1.
Figure 3:
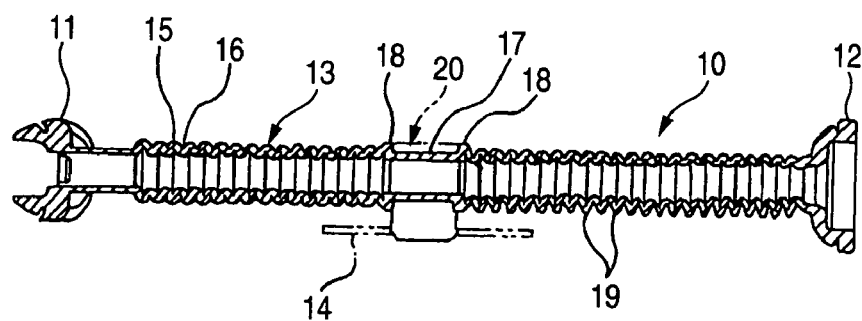
FIG. 3 is a cross-sectional view taken along the line III—III of FIG. 2.

As shown in FIGS. 1 to 3, the grommet 10 (serving as an elongate member in the invention) for the passage of a wire harness (not shown) (which is installed between a vehicle body (not shown) and a trunk lid (not shown) which can be opened and closed relative to the vehicle body through a link mechanism) therethrough so as to protect the wire harness includes a first fixing portion 11 of an annular shape for being fixed to the vehicle body, a second fixing portion 12 of an annular shape for being fixed to the trunk lid, and a flexible tubular portion 13 extending between the first fixing portion 11 and the second fixing portion 12.

The tubular portion 13 has a bellows-like shape, and includes alternate larger-diameter portions 15 and smaller-diameter portions 16 which are arranged along a common axis, and an attaching portion 17 of a cylindrical shape for being gripped by the clip 20 (embodying the invention) is provided at a generally axially-central portion of the tubular portion 13. Ribs 18, larger in diameter than the tubular portion 13, are formed at axial opposite ends of the attaching portion 17, respectively. Convex portions 19 are formed respectively at those portions of the larger-diameter portions 15 of the tubular portion 13 which are adapted to contact the trunk lid, and therefore these portions are molded into a larger thickness than the other portions, so that those portions of the larger-diameter portions 15 for contact with the trunk lid are reinforced.

The clip 20 grips the attaching portion 17, and in this condition the dip fixes the tubular portion 13 to a link (plate member) 14 of the link mechanism. As shown in FIGS. 4 and 5, this clip has an cylindrical portion (holding portion) 21 for gripping the attaching portion 17.

The cylindrical portion 21 includes a half-cylindrical member 21a, and a half-cylindrical member 21b which is releasably attached to the half-cylindrical member 21a through a hinge 21c or the like so as to be opened and dosed relative thereto A pair of arms 22 for engagement respectively with widthwise opposite side edges of the link 14 are integrally connected to the half-cylindrical portion 21a, and each of the arms 22 continuously extends in the longitudinal direction of the link 14. As shown in FIG. 6, step portions 23 for respectively retaining the pair of arms 22 are formed respectively at the widthwise opposite side edges of the link 14 with which the pair of arms 22 can be engaged. Blades 24 are formed respectively at axial opposite ends of the half-cylindrical member 21a, and these blades 24 are bent toward the surface of the link 14 so as to resiliency contact this surface.

The attaching portion 17 of the tubular portion 13 is gripped by the cylindrical portion 21 of the dip 20, and in this condition the pair of arms 22 are retainingly engaged with the step portions 23 of the link 14, respectively, and also the blades 24 are bent toward the surface of the link 14 to be held in resilient contact with this surface, thereby fixing the tubular portion 13 to the link 14 of the link mechanism through the clip 20. In this fixed condition, the tubular portion 13 is rotatable relative to the cylindrical portion 21 of the clip 20.

In the above clip structure, the cylindrical portion 21 of the clip 20 holds the attaching portion 17 of the grommet 10, and in this condition the pair of arms 22 are engaged with the widthwise opposite side edges of the link 14 of the link mechanism, respectively, and also the blades 24 are held in resilient contact with the surface of the link 14. Therefore, the clip 20 is prevented from shaking in the longitudinal direction of the link 14.

And besides, the pair of arms 22 are retainingly engaged respectively with the step portions 23 provided respectively at the widthwise opposite side edges of the link 14, and therefore the clip 20 is more positively prevented from shaking in the longitudinal direction of the link 14.

The clip structure of the present invention is not limited to the above embodiment, and suitable modifications and improvements can be made.

For example, in the above embodiment, although the link 14 of the link mechanism is shown as the plate member to which the clip 20 is fixed, the dip may be fixed to a plate member of the vehicle body or a plate member of the trunk lid.

Furthermore, in the above embodiment, the step portions 23, provided respectively at the widthwise opposite side edges of the link 14, are formed by notches, respectively. However, instead of these step portions, step portions 23 may be formed by forming projections 25 on the widthwise opposite side edges of the link 14, the projections 25 on each side edge being spaced from each other in the axial direction as shown in FIG. 7.

Furthermore, in the above embodiment, the convex portions 19 are formed respectively at those portions of the larger-diameter portions 15 of the tubular portion 13 for contact with the trunk lid, thereby providing the reinforcing portions. However, instead of this construction, there may be used a construction in which the circular inner and outer peripheries of each of relevant larger-diameter portions 15 are eccentric with respect to each other, thereby forming the thickened portion 26 at that portion of each of the larger-diameter portions 15 of the tubular portion 13 for contact with the trunk lid, thus providing a reinforcing portion, as shown in FIG. 8.

The material, shape, dimensions, form, number, disposition, etc., of the plate member, the elongate member, the holding portion, the arms, the blades, the step portions and so on, illustrated in the above embodiment, are arbitrary, and are not limited in so far as the invention can be achieved.

What is claimed is:

1. A fixing device for fixing an elongate member along a plate member, comprising:
   a holding portion, which holds the elongate member;
   an engagement member, which retains the plate member; and
   a resilient portion, which resiliently contacts with a face of the plate member,
   wherein the engagement member is a pair of arm portions which retain widthwise opposite outer side edges at step portions of the plate member;
   wherein the resilient portion is resilient blades which are respectively formed at both ends of the holding portion in a longitudinal direction of the plate member,
   wherein the resilient blades are arranged along a first direction in which the elongate member extends; and
   wherein the pair of arm portions are arranged along a second direction perpendicular to the first direction.

2. The fixing device as set forth in claim 1, wherein step portions which are respectively engaged with the arm portions are provided at the widthwise opposite side edges of the plate member, respectively.

3. The fixing device as set forth in claim 1, wherein the holding portion has a generally tubular shape to allow gripping of the elongate member.

* * * * *